Aug. 3, 1965 D. I. BOHN 3,198,184
AUTOMATIC SPEED CONTROL DEVICE
Filed Jan. 12, 1961 3 Sheets-Sheet 1
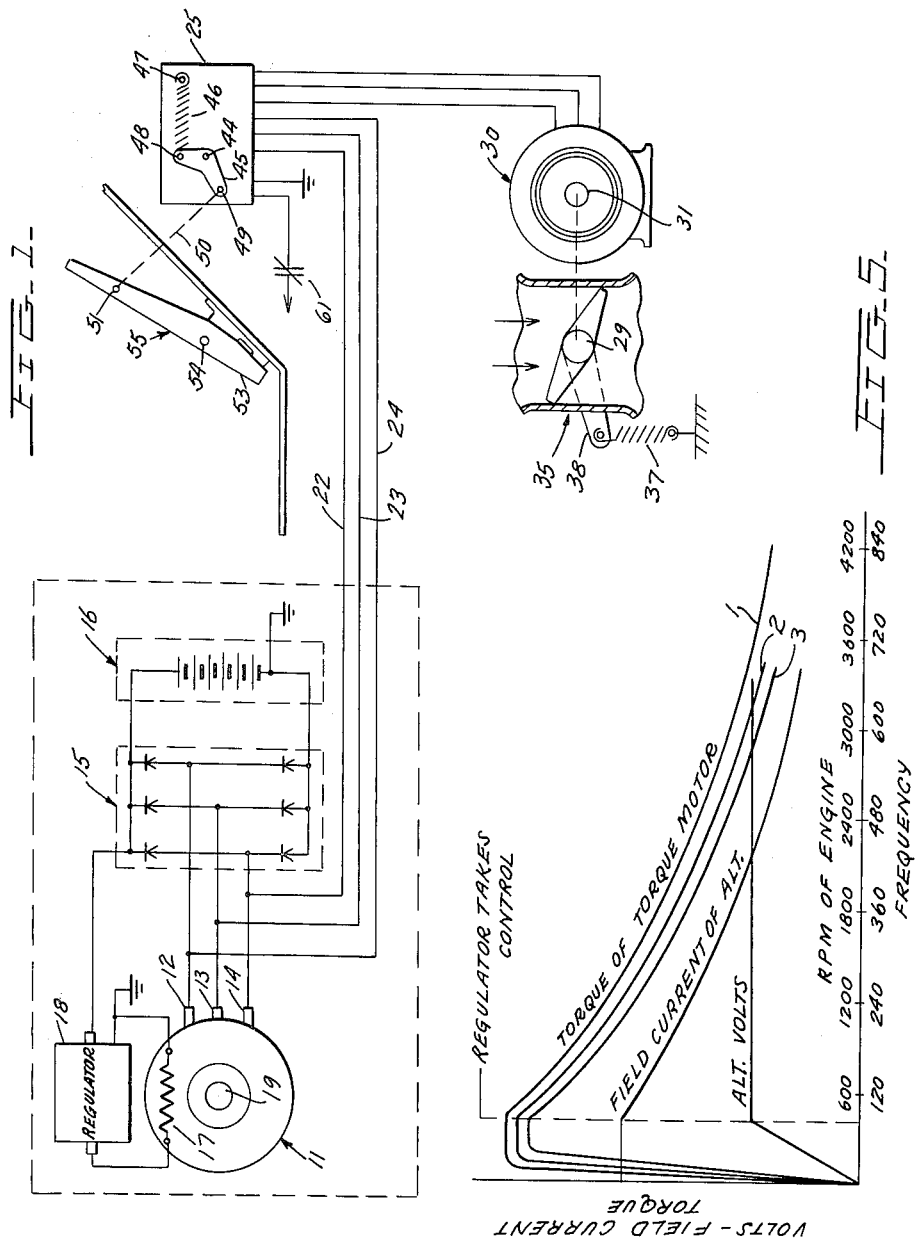
INVENTOR.
DONALD I. BOHN
BY
OSTROLENK, FABER, GERB & SOFFEN
ATTORNEYS

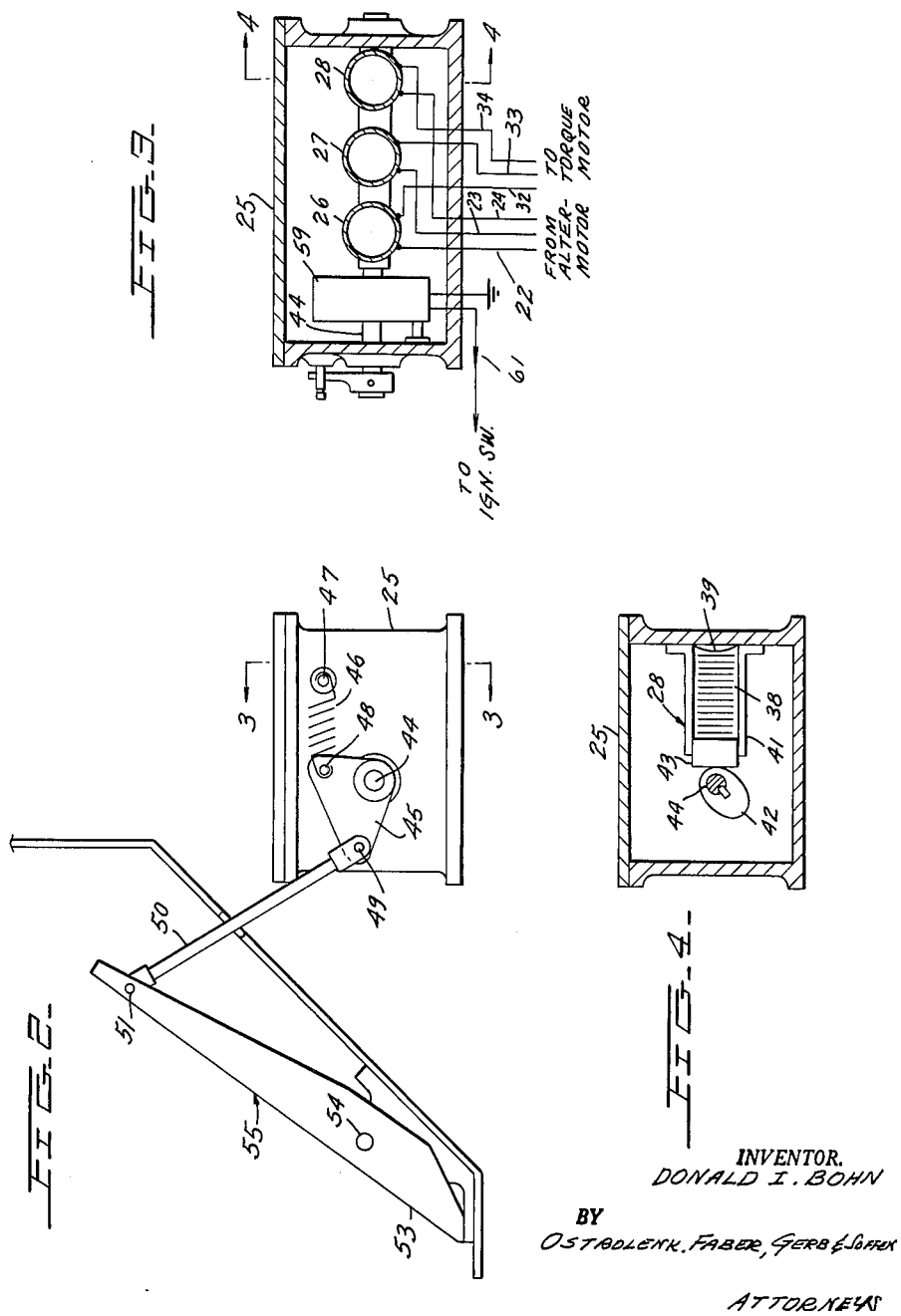

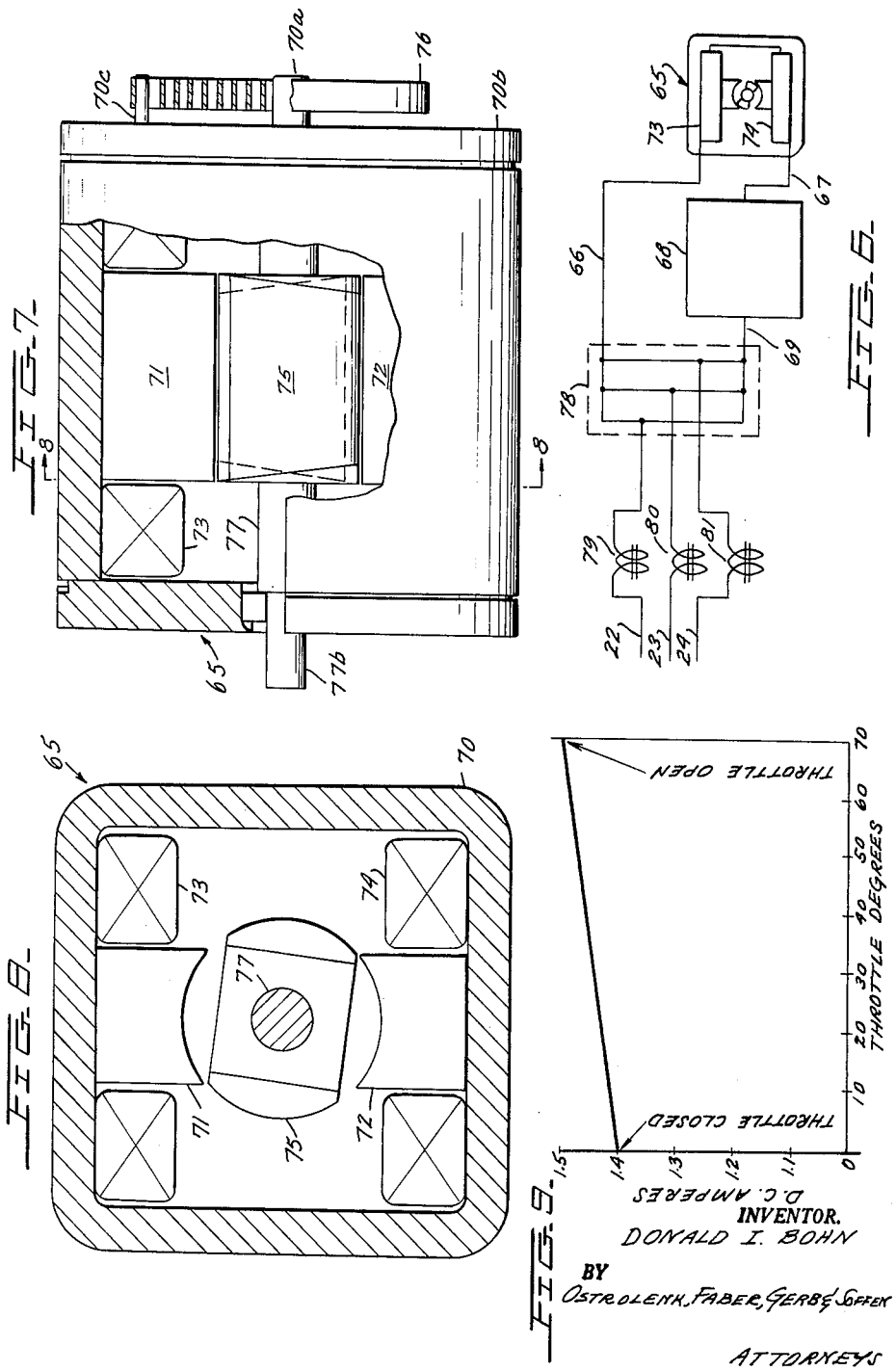

United States Patent Office 3,198,184
Patented Aug. 3, 1965

3,198,184
AUTOMATIC SPEED CONTROL DEVICE
Donald I. Bohn, 377 Country Club Road, Asheville, N.C.
Filed Jan. 12, 1961, Ser. No. 82,337
11 Claims. (Cl. 123—98)

This invention relates to automatic speed control means for an internal combustion engine in general and more particularly to a means of this type for maintaining the speed of an automobile substantially constant, at any preset speed, as it goes up and down grades.

Prior art devices for automatically regulating automobile speed have had two principal disadvantages. Namely, if the device failed to operate properly the engine would begin to operate at maximum speed. In addition, it was necessary to manually place the speed control means in and out of service.

The instant invention overcomes these disadvantages of prior art devices by providing a device which is always in service and which if it fails to operate, will cause the engine speed to be reduced to an idle. This is accomplished by utilizing a throttle or carburetor butterfly valve which is biased to closed position. Means are provided which act in opposition to the biasing means to move the butterfly valve from a predetermined setting in response to engine speed.

In one embodiment of this invention the last recited means comprises a torque motor having a series resistor and being energized by an alternator driven by the automobile engine. Means are provided to vary the alternator field resistance so that the voltage output of the alternator is substantially constant over a wide range of engine speeds. However, the frequency of the alternator output varies directly with engine speed.

The output of the torque motor is a function of its current. With a constant voltage being generated by the alternator, the magnitude of this current is determined by the value of the torque motor impedance and the frequency of the alternator output since the torque motor impedance is mostly reactance.

The torque motor series resistance in each phase is automatically adjusted to its proper setting by the depressed position of the accelerator pedal, as will be more fully explained. Thereafter, when the accelerator pedal is released a clutch device maintains the accelerator pedal in position.

As the automobile approaches an upgrade there is a tendency for the motor to slow down. Thus, the output voltage of the alternator though of constant magnitude is of a lower frequency. The impedance of the torque motor is lowered so that more current flows and the output of the torque motor increases which in turn opens the throttle to speed the engine up. When the automobile is going downgrade the engine has a tendency to speed up. This causes the alternator to generate a voltage of increased frequency so that the impedance of the torque motor increases and the current therethrough decreases. Thus, the torque of the torque motor decreases and the throttle control is operated by its biasing means to slow the engine.

With the arrangement as above outlined, if there is any loss of voltage or any malfunctioning of the electrical system, the throttle control biasing means will be effective to move the throttle to a position where the engine is at idling speed. This is the fail safe feature of the instant invention.

In the instant invention the accelerator pedal is for the most part operated like the pedal of an organ. That is, toe pressure must be applied for an increase in speed while heel pressure must be applied for a decrease in speed. The accelerator pedal will be held in the position to which it is moved by foot through the action of a clutch device which acts against a biasing means urging the accelerator pedal to a position for lowest engine speed. When the automobile brakes are applied, the clutch is automatically released and the pedal spring returns the pedal to a position where lowest engine speed is obtained.

Thus, it is seen that with the instant invention the automatic speed control means is always in service. Yet accelerating and decelerating takes place in substantially the conventional manner. It is not necessary to operate an auxiliary control to place the speed control means in service.

In another embodiment of this invention, the alternating current operated torque motor is replaced by a direct current solenoid. A rectifier and reactor unit are utilized in conjunction with the solenoid to produce a torque drooping characteristic with increasing speed similar to the characteristic produced by the alternating current torque motor.

Accordingly, it is a primary object of this invention to provide a novel construction for an engine automatic speed control means.

Another object is to provide an automatic speed control means having fail safe features.

Still another object is to provide a speed control means which does not require an intentional act to place it in or out of service.

A further object is to provide an automatic speed control means which includes a torque motor for operating the engine fuel supply device.

A still further object is to provide a novel engine speed control device operable over a wide range of engine speeds.

These as well as other objects of this invention shall become readily apparent after reading the following description of the accompanying drawings in which:

FIGURE 1 is a schematic of an automatic speed control system constructed in accordance with the teachings of the instant invention.

FIGURE 2 is a fragmentary view of the system of FIGURE 1 illustrating the accelerator pedal and its cooperation with the torque motor series resistances.

FIGURE 3 is a cross section taken through line 3—3 of FIGURE 2 looking in the direction of arrows 3—3.

FIGURE 4 is a cross section taken through line 4—4 of FIGURE 3 looking in the direction of arrows 4—4.

FIGURE 5 is a graph illustrating variations of torque motor torque, alternator field current, and alternator output voltage each versus engine speed.

FIGURE 6 is a schematic illustrating another embodiment of this invention in which the torque motor is a direct current operated device.

FIGURE 7 is a side elevation, partially sectioned, of the torque motor of FIGURE 6.

FIGURE 8 is a cross-section taken through line 8—8 of FIGURE 7 looking in the direction of arrows 8—8.

FIGURE 9 is a graph illustrating motor current versus angular position of the throttle shaft for the embodiment of FIGURES 6–8.

Now referring to the FIGURES, and more particularly to FIGURES 1 through 5, the automatic speed control arrangement of the instant invention comprises an alternator 11 which produces a three phase output at terminals 12–14. Output terminals 12–14 are connected to the input of rectifier unit 15 whose output charges battery 16 and also energizes alternator field 17 through regulator 18. Regulator 18 is of a conventional construction and acts to maintain the current through field 17 at such a value that the output voltage at terminals 12–14 is substantially constant for a wide range of alternator speeds, it being understood that alternator shaft 19 is driven by the engine of the automobile in question.

The elements hereinbefore described are of a type well known to the automobile art, being presently in use in products of the Chrysler Corporation.

Conductors 22–24 connect terminals 12–14 respectively to one of the terminals of each of the resistors 26–28, respectively, which are disposed within housing 25. The other terminals of resistors 26–28 are connected through leads 32–34 to the field of torque motor 30. Output shaft 31 of motor 30 is connected to shaft 29 of the engine fuel control means 35 to operate valve element 36 thereof.

Spring 37 acting through arm 38 connected to shaft 29 biases element 36 counterclockwise to the closed position of FIGURE 1. When motor 30 is energized the torque produced at shaft 31 thereof tends to rotate element 36 toward the open position acting against the force of spring 37. Torque motor 30 is a squirrel cage motor operating at reduced voltage so that continuous stall operation will not cause damage thereto.

The impedance of current flow to the stator of torque motor 30 is the sum of resistances 26–28 and the impedances of the stator windings themselves. A substantial portion of the torque motor impedance is comprised of inductive reactive. Thus, even though there is a constant magnitude of output voltage at alternator terminals 12–14, the magnitude of current through the torque motor 30 is dependent upon the frequency of the output voltage generated by alternator 11, and varies in inverse relation to the frequency.

If the engine driving alternator shaft 19 tends to slow down, the frequency of the voltage energizing torque motor 30 decreases. Thus, the impedance of the motor circuit decreases so that the current flowing therethrough increases. This causes an increased torque to be produced at shaft 31 which acts against the force of spring 37 to open element 36 and speed up the engine.

Conversely, when the engine tends to speed up the frequency of the voltage feeding the field windings of motor 30 will increase. The increased frequency reduces the magnitude of motor current thereby reducing the torque produced at shaft 31 permitting element 36 to move toward closed position under the influence of spring 37.

So much of the invention as hereinbefore described would be effective to maintain engine speed at one predetermined value only. In order to provide regulation over a wide speed range, the resistances of resistors 26–28 are variable. Since each of the resistors 26–28 is of identical construction, only resistor 28 will be described.

Resistor 28 comprises a pile of carbon disks 38 disposed within a generally cylindrical insulating housing 41. Carbon disks 38 are lightly compressed by spring 39 positioned at one end of the pile while an insulating block 43 is positioned at the other end of the pile.

Cam 42 acting through block 43 serves to vary the pressure on pile 38. Cam 42 is keyed to shaft 44 which extends externally of housing 25. Crank 45 positioned externally of housing 25 is keyed to shaft 44. Tension spring 46, connected to housing pin 47 and crank pin 48, biases crank 45 in a clockwise direction.

Rod 50 is connected at one end thereof to crank pin 49 and at the other end 51 thereof to the toe of accelerator pedal 55. Accelerator pedal 55 is mounted at a point intermediate the ends thereof to stationary pivot 54. It is to be noted that pivot 54 is located closer to heel 53 than to toe 51 in the manner of an organ pedal. Thus, it is seen that spring 46 biases pedal 55 counterclockwise about pivot 54.

Magnetic brake 59 acts upon shaft 44 to maintain the latter at the angular position to which it is moved through the manipulation of accelerator pedal 55. Brake 59 is an electrically operated device whose energizing circuit is provided with switch 61 which is opened whenever the automobile brake is applied. Thus, whenever the automobile brake is applied switch 61 is opened and brake 59 releases shaft 44 to permit accelerator pedal 55 to be returned by spring 46 to the position illustrated in FIGURE 2.

The over-all device operates in the following manner. Pedal 55 is operated to a position such that the automobile in question travels at the desired speed on a level road. As pedal 55 is manipulated the resistances of resistors 26–28 are adjusted thereby adjusting the magnitude of the current to the field of torque motor 30. Pedal 55 is then released but remains in position through the action of brake 59. As has hereinbefore been explained, if automobile speed, hence engine speed, tends to increase, the output voltage of alternator 11 increases in frequency so that the torque delivered by motor 30 decreases permitting throttle element 36 to move toward closed position thereby slowing the engine. As has also been hereinbefore explained, a reverse sequence of operation takes place whenver the engine speed drops below the desired value. In this manner engine speed remains constant.

Now referring more particularly to FIGURE 5, it is seen that the magnitude of alternator voltage increases as the engine speed increases from zero to 400 r.p.m. At higher engine speeds, the magnitude of alternator voltage remains constant. However, within this range of constant alternator voltage, the frequency thereof increases with engine speed. Because of frequency variations in the constant magnitude voltage feeding the torque motor, the torque of the torque motor is seen to have a drooping characteristic from the point at which the alternator field current regulator assumes control.

Each of the curves 1–3 of torque of torque motor versus frequency are for a different value of series resistance. As will be readily understood by those skilled in the art, curve 1 is obtained when the resistance is the lowest of the resistances in question. That is, when the pedal 55 is depressed most. Similarly, curve 3 depicts torque of torque motor when the pedal 55 is depressed least to produce the greatest resistance.

FIGURES 6–9 illustrate a modification of the speed control means of FIGURES 1–5 previously described. In the embodiment of FIGURES 6–9, the A.C. torque motor has been replaced by D.C. rotary solenoid 65 operated in conjunction with rectifier 78 and reactor units 79–81. Reactor units 79–81 are connected in series with the respective conducting lines 22–24 from the output of alternator 11 to the input of three phase rectifier 78. Rectifier output line 66 extends to one terminal of motor coils 73, 74 whose other terminal is connected through line 67 to the pedal operator resistor and brake unit 68. The other rectifier output line 69 is connected to unit 68. Unit 68 comprises elements similar to the combination within housing 25. However, only a single pedal adjusted resistor is provided since solenoid 65, being D.C. operated, is the equivalent of a single phase device.

Solenoid 65 is a D.C. torque motor comprising a rectangular steel tube 70 provided with end caps 70a, 70b. Rectangular steel pole pieces 71, 72 are secured to opposite walls of tube 70 and are surrounded by coils 73, 74, respectively, which are series connected. Rotor or armature 75 is mounted on shaft 77 which is journaled in bearings fitted to caps 70a, 70b.

Armature 75 comprises two poles which are closely spaced with respect to poles 71, 72 being within .010″ thereof. As illustrated, the armature poles are chamfered to produce the torque required and obtain the desired relationship between current and shaft position as illustrated in the graph of FIGURE 6.

Spiral spring 76, connected at one end to cap extension 70c and at the other end to shaft end 77a, biases shaft 77 to the throttle closed position of FIGURE 8. The other end 77b of shaft 77 is connected to throttle shaft 29 as a substitute for motor shaft 31 in the embodiment of FIGURES 1–5.

Series reactors 79–81 make the arrangement of FIGURE 6 responsive to frequency. That is, as the constant magnitude voltage of alternator 11 increases in frequency with increased engine speed, the impedances of reactors 79–81 increase so that a D.C. lesser current flows through motor coils 73, 74. Hence, a lesser torque will act upon throttle shaft 29 so that fuel control means 35 supplies less fuel to the engine causing it to slow down.

Conversely, as engine speed falls below the selected speed, the output voltage of alternator 11 drops in frequency. The impedances of reactors 79–81 decrease so that a greater D.C. current flows through motor coils 73, 74. Thus, a greater torque will act upon shaft 29 so that fuel control means 35 supplies more fuel to the engine causing an increase in engine speed.

It should be readily understood by those skilled in the art that the carbon piles hereinbefore described may readily be replaced by conventional type variable resistors having wiper arms operated by the accelerator pedal. In addition, it is to be understood that the references hereinbefore made to constant speed for varying loads may not, strictly speaking, be entirely correct. That is, it may be desirable to proportion the parameters such that the speed setting obtained by the pedal setting may increase, say 5%, as the engine load decreases sharply and decrease, say 5%, as the engine load increases sharply.

Thus, this invention provides a novel control means for maintaining the speed of an internal combustion engine substantially constant over a wide range of varying loads. This arrangement is such that upon failure of the control means to function properly, the engine will run at idling speed. In addition, the arrangement is such that no intentional act is required in order to place the arrangement in operation.

In view of the foregoing, the invention has been described only in connection with preferred embodiments thereof. Many variations and modifications of the principles of the invention within the scope of the description herein are obvious. Accordingly, it is to be bound not by the specific disclosure herein but only by the appending claims.

I claim:

1. In combination an automatic control arrangement and an engine, said arrangement comprising, a first means driven by the engine, a second means for controlling fuel flow to the engine, said second means including an element biased toward a first position, a third means energized by said first means and operatively connected to said element for movement thereof away from said first position toward a second position, said second means permitting a greater fuel flow to the engine when said element is in said second position than in said first position; said first means comprising an alternator whose output supplies the energy for operation of said third means.

2. In combination an automatic control arrangement and an engine, said arrangement comprising, a first means driven by the engine, a second means for controlling fuel flow to the engine, said second means including an element biased toward a first position, a third means energized by said first means and operatively connected to said element for movement thereof away from said first position toward a second position, said second means permitting a greater fuel flow to the engine when said element is in said second position than in said first position; said first means comprising an alternator and a device for maintaining alternator output voltage magnitude reasonably uniform as the output voltage frequency varies over a wide range.

3. In combination an automatic control arrangement and an engine, said arrangement comprising, a first means driven by the engine, a second means for controlling fuel flow to the engine, said second means including an element biased toward a first position, a third means energized by said first means and operatively connected to said element for movement thereof away from said first position toward a second position, said second means permitting a greater fuel flow to the engine when said element is in said second position than in said first position; said first means comprising an alternator and a device for maintaining alternator output voltage magnitude reasonably uniform as the output voltage frequency varies over a wide range; said third means including a mechanically variable impedance element; a fourth means for selectively varying said impedance element to obtain a desired engine speed setting.

4. The combination of claim 3 in which the third means also includes a portion whose impedance is a function of frequency.

5. The combination of claim 4 in which the fourth means includes a movable member, biasing means urging said member to a third position and fifth means for maintaining said member in the position to which it has been moved against the force said biasing means urging said member to said third position.

6. The combination of claim 5 in which the member comprises a pedal pivoted at a point intermediate the ends thereof so as to be movable in one direction by toe pressure and in the opposite direction by heel pressure.

7. The combination of claim 6 in which the fifth means comprises an electrically operated device, a switch for deenergizing said fifth means, said switch being operable by application of a brake for a device driven by the engine in question.

8. The combination of claim 7 in which the impedance element comprises a stack of conductive disks, said fourth means also including a cam means operated by said pedal for varying pressure in said stack.

9. In combination an automatic control arrangement and an engine, said arrangement comprising, a first means driven by the engine, a second means for controlling fuel flow to the engine, said second means including an element biased toward a first position, a third means energized by said first means and operatively connected to said element for movement thereof away from said first position toward a second position, said second means permitting a greater fuel flow to the engine when said element is in said second position than in said first position; said first means comprising an alternator and a device for maintaining alternator output voltage magnitude reasonably uniform as the output voltage frequency varies over a wide range; said third means including a mechanically variable impedance element; a fourth means for selectively varying said impedance element to obtain a desired engine speed setting; said third means comprising a torque motor having a field winding whose impedance is substantially reactive.

10. The combination of claim 9 in which the torque motor is an A.C. operated device operatively connected to operate said element toward said second position.

11. In combination an automatic control arrangement and an engine, said arrangement comprising, a first means driven by the engine, a second means for controlling fuel flow to the engine, said second means including an element biased toward a first position, a third means energized by said first means and operatively connected to said element for movement thereof away from said first position toward a second position, said second means permitting a greater fuel flow to the engine when said element is in said second position than in said first position; said first means comprising an alternator and a device for maintaining alternator output voltage magnitude reasonably uniform as the output voltage frequency varies over a wide range; said third means including a mechanically variable impedance element; a fourth means for selectively varying said impedance element to obtain a desired engine speed setting; said third means comprising a portion whose impedance is a function of frequency; said third means also comprising rectifier means fed by said portion and a D.C. torque motor fed by said rectifier means; said torque motor operatively connected to operate said element toward said second position.

References Cited by the Examiner

UNITED STATES PATENTS

| | | | |
|---|---|---|---|
| 1,345,539 | 7/20 | Fynn | 123—102 |
| 2,637,014 | 4/53 | Stallard | 322—32 |
| 2,637,015 | 4/53 | Franklin | 322—32 |
| 2,661,071 | 12/53 | Hoener | 123—102 |
| 2,897,906 | 8/59 | Brueder | 123—102 |
| 2,911,077 | 11/59 | Carter | 123—102 |
| 2,916,116 | 12/59 | Eddy et al. | 123—102 |
| 3,049,110 | 8/62 | Kerr | 123—102 |

FOREIGN PATENTS 430,463   8/11   France.

FRED E. ENGELTHALER, *Primary Examiner.*

KARL J. ALBRECHT, RICHARD B. WILKINSON,
*Examiners.*